Dec. 29, 1936.  A. C. FISCHER  2,065,522
COMPOSITION SHEET
Filed Nov. 30, 1931
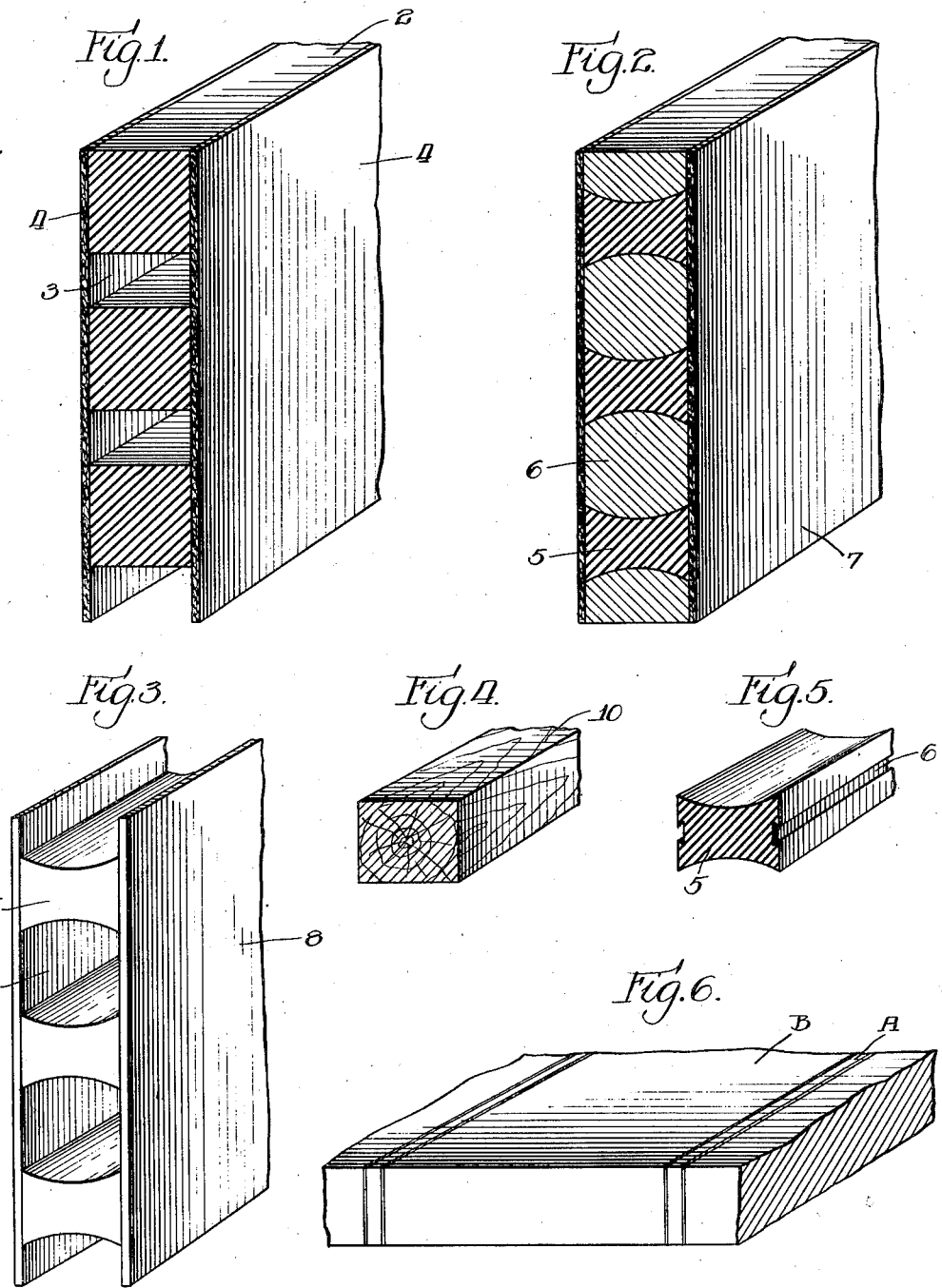
Inventor,
Albert C. Fischer
By Albert G. Robinson
Atty Patented Dec. 29, 1936

2,065,522

UNITED STATES PATENT OFFICE 2,065,522

COMPOSITION SHEET

Albert C. Fischer, Chicago, Ill.

Application November 30, 1931, Serial No. 577,962

10 Claims. (Cl. 94—18)

This invention relates to the construction of composition sheets comprising a core composed of strips, of the same or different character material, alternately disposed in spaced or unspaced relation and faced with imperforate surfacing sheets to provide a composite sheet of novel and improved character and construction.

The invention consists in the novel methods, combinations and arrangements hereinafter described or claimed for carrying out the above stated object and such other objects as will hereinafter appear.

For a better understanding of the invention reference may be made to the accompanying drawing, in which:

Fig. 1 is a perspective view of a composition sheet having a core of spaced strips faced with surfacing layers;

Fig. 2 is a perspective view of a composition sheet having a core composed of alternately disposed strips of different material and faced with surfacing layers;

Fig. 3 is another modified form of the invention;

Fig. 4 is a perspective view of a temporary crowning strip;

Fig. 5 is a perspective view of a modified form of core strip adapted to interlock with the surfacing layers; and Fig. 6 is a concrete or the like paving section in which the composition sheets may be inserted at spaced intervals to allow for contraction and expansion.

The novel and improved composition sheet is adapted for various uses, particularly for thermal and sound insulation, cushioning layers for floors, pavements, walls, and the like, and for spacing rigid elements to allow for contraction and expansion under varying temperatures.

The invention, for the purpose of illustration, is typified by construction sheets, such as, expansion joints, which are inserted longitudinally or transversely at spaced intervals A in a concrete, stone or the like pavement B to divide the pavement into blocks or sections.

The construction sheets, as in Fig. 1, comprise a core composed of strips 2, spaced to provide longitudinal recesses 3, and surfacing layers 4 which are molded or adhered to the spaced strips to secure same in spaced relation. The strip may be of any suitable material, such as ordinary rubber or the like, which is resilient and capable of expanding upon release of a compressing force. These strips may be separately formed and secured in spaced relation between the surfacing sheets or they may be molded therewith. It is understood that if the strips are molded with the surfacing sheets, they would ordinarily be formed of the same material. If any or all of the strips are separately formed, they may be of different material, and also of different material than the surfacing sheets.

The surfacing sheets may be of rubber composition, or they may be of such material as bituminized paper, felt or the like, and adhered to the core strips by any suitable adhesive material, such as an asphaltic layer applied as a coating thereon.

The modified construction in Fig. 2 comprises core strips 5 and 6 of different material laid in contact without any intervening spaces. However, they may be spaced after the manner shown in Fig. 1 if desired. Strips 5 may advantageously be of ordinary rubber material, and strips 6 may advantageously be of sponge rubber material. Ordinarily, intervening spaces between the strips are not necessary, as the sponge rubber strips function much as the spaces in permitting adjacent strips to flex without being squeezed beyond the boundaries of the composition strip. Surfacing sheets are applied to face the core strips 7.

The modification in Fig. 3 is substantially the same as that of Fig. 2 with the sponge rubber strips 6 eliminated to provide unfilled spaces 8. When the surfacing layers are adhered to the core strips, it may in some instances be preferable to provide a more secure union, in which case strips 5 may advantageously be provided with grooves 9 for receiving the adhesive material applied to the surfacing sheets.

Strips 5 may be arranged flush with the edge of the composition sheet, as in Fig. 1, to provide squared edges or they may be spaced from the top edge, as in Fig. 3, in order to receive a poured filling or crown after the sheet is inserted in the pavement. For supporting the margins of the surfacing sheets, which extend above the core strips, a temporary filling or crowning strip 10 may be employed, the same preferably being of a size to fill the marginal recess. After the sheet is inserted in the pavement the wooden strip may be removed and replaced with a filling, such as asphalt or the like, poured therein.

While I have shown various embodiments typifying my invention and described them in detail, it will be understood that the invention is not limited thereby. Various changes may be made in details of construction without departing from the spirit of the invention.

I claim:

1. A composition sheet comprising a core composed of two or more strips spaced apart to provide intervening spaces, sponged elastic strips inserted in the intervening spaces, and surfacing sheets applied to cover the core and hold same in assembled relation.

2. A composition sheet comprising a core composed of two or more strips spaced apart to provide intervening spaces, surfacing sheets applied to face the core and extend above the core along one margin edge to provide a space, and a filling crown inserted within the marginal space.

3. A composition sheet for forming and continuously sealing a joint between expandable slabs comprising a core composed of elastic strips spaced apart to provide an intervening space, and facing strips adhesively secured to the core to cover the spaces.

4. A composition sheet comprising a core composed of elastic strips spaced apart to provide intervening spaces, grooves formed along the edges of the strips to receive a plastic adhesive, and surfacing sheets applied to the core to engage with grooves in the core strips.

5. A paving construction comprising paving sections having spacing sheets interposed at intervals to separate the sections, each of said sheets comprising a core composed of strips spaced apart to provide intervening spaces, material inserted within the spaces, and surfacing sheets applied to the face of the core.

6. A paving construction comprising paving sections having spacing sheets interposed at intervals to separate the sections, each of said sheets comprising a core composed of strips spaced apart to provide intervening spaces, surfacing sheets applied to the face of the core and extending to provide a space along one edge, and a crowning strip adapted to be inserted within the marginal space.

7. A composition sheet comprising a core composed of two or more separate rubber strips of different character, and surfacing sheets applied to the face of the core.

8. An expansion joint between two paving slabs including a plurality of horizontal strips of a tough resilient material, and means for holding said strips initially separated to provide space for their change of shape as said slabs expand.

9. An expansion joint between two paving slabs including a plurality of horizontal strips of rubber material, and means for holding said strips initially separated to provide space for their change of shape as said slabs expand.

10. An expansion joint between two paving slabs including a plurality of horizontal strips of solid rubber material and means for holding said strips initially separated to provide space for their change of shape as said slabs expand.

ALBERT C. FISCHER.